Patented Jan. 5, 1954

2,665,292

UNITED STATES PATENT OFFICE 2,665,292

METAL XANTHATES OF THE HALOARYL POLYALKYLENE GLYCOL MONOETHERS

Bryant Charles Fischback, Walnut Creek, Calif., assignor to The Dow Chemical Company, Midland, Mich., a corporation of Delaware No Drawing. Application October 11, 1951, Serial No. 250,943

13 Claims. (Cl. 260—455)

The present invention is concerned with xanthates and is particularly directed to the metal xanthates of the haloaryl polyalkylene glycol monoethers. Representative members of this class of compounds are the metal xanthates of the haloaryloxy-ethoxy-ethanols, haloaryloxy-ethoxy-ethoxy-ethanols, haloaryloxy-propoxy-propoxy-propanols and haloaryloxy-propoxy-propanols. The latter compounds may be characterized by the following formula

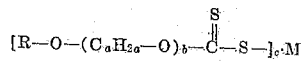

wherein R represents a haloaryl radical, $a$ and $b$ each represents one of the integers 2 and 3, M represents a metal ion and $c$ is an integer representing the valence of the metal ion M. These metal xanthate compounds are for the most part crystalline solids, somewhat soluble in acetone and water and relatively insoluble in aliphatic hydrocarbons and ether. The new compounds are useful as intermediates for the preparation of more complex organic materials and as active constituents of plant growth control compositions, e. g. herbicidal mixtures.

The new compounds may be prepared by reacting together (1) carbon bisulfide (2) a suitable metal hydroxide, e. g. sodium hydroxide, calcium hydroxide or potassium hydroxide and (3) a haloaryl polyalkylene glycol monoether of the formula

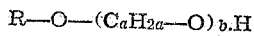

wherein R, $a$ and $b$ are each as previously defined. The reaction is conveniently carried out in an inert organic solvent in which the desired xanthate product is insoluble and preferable in a low boiling solvent such as ether or normal pentane. Good results are obtained when one molecular proportion of the metal hydroxide is employed with molecular proportions of the carbon bisulfide and haloaryl polyalkylene glycol monoether corresponding to the valence of the metal in the metal hydroxide.

In the foregoing method, the haloaryl polyalkylene glycol monoether and metal hydroxide may be dispersed in the reaction solvent and the carbon bisulfide added portionwise thereto with stirring. The reaction is somewhat exothermic and takes place smoothly in the temperature range of from 20° to 40° C. The temperature may be controlled by regulation of the rate of contacting the reactants as well as by the addition and subtraction of heat, if required. In practice, it is oftentimes convenient to operate at the boiling temperature of the reaction mixture and under reflux. Upon completion of the reaction, the reaction product may be separated by conventional method, e. g. filtration or decantation.

Optionally, the haloaryl polyalkylene glycol monoether and carbon bisulfide may be dispersed in the reaction solvent and the metal hydroxide added portion-wise with stirring. The conditions of reaction and methods of separation are essentially as previously described.

In an alternative procedure, a readily water soluble metal xanthate compound, as obtained in accordance with the foregoing paragraphs, may be dispersed in a minimum amount of water and the resulting solution reacted with a concentrated aqueous solution of a molecular excess of a water soluble alkaline earth metal or heavy metal salt, e. g. barium acetate, zinc chloride, copper sulfate, aluminum acetate, etc. The desired alkaline earth metal or heavy metal xanthate compound is recovered from the reaction mixture in any suitable fashion, e. g. by concentrating to a small volume and filtration or decantation, or by filtration where the desired product spontaneously precipitates in the course of the reaction.

The following examples illustrate the invention but are not to be construed as limiting the same:

Example 1

244.6 grams (1 mole) of 4-chlorophenoxy-propoxy-propanol, 62.3 grams of powdered 90 per cent potassium hydroxide (equivalent to 1 mole of KOH) and 2500 milliliters of anhydrous diethyl ether were placed in a reactor provided with a stirrer and a Dry-Ice cooled condenser. With the stirrer operating, 83.7 grams (1.1 mole) of carbon bisulfide was added to the above mixture. Stirring was then continued for about 3 hours and the reaction mixture thereafter filtered and the residue dried. As a result of these operations, a potassium 4-chlorophenoxy-propoxy-propylxanthate product was obtained as a crystalline solid. The latter product was recrystallized from acetone and found to have a melting range of from 162° to 175° C.

Example 2

In an exactly analogous fashion, 1 mole quantities of 4-chlorophenoxy-propoxy-propoxy-propanol and powdered potassium hydroxide and 1.1 moles of carbon bisulfide were reacted together in diethyl ether to obtain a potassium 4-chlorophenoxy - propoxy - propoxy - propylxanthate product as a crystalline solid. The latter was found to have a melting range of from 124° to 136° C.

Example 3

1 mole quantities of 4-chloro-2-methylphenoxy-propoxy-propanol and powdered potassium hydroxide and 1.1 moles of carbon bisulfide were reacted together in diethyl ether as described in Example 1 to obtain a potassium 4-chloro - 2 - methylphenoxy - propoxy - propylxanthate product. The latter is a crystalline solid melting at from 172° to 178° C.

Example 4

In a similar manner, 1 mole quantities of 2,4-dichlorophenoxy-propoxy-propanol and potassium hydroxide and 1.1 moles of carbon bisulfide were reacted together in diethyl ether to obtain a potassium 2,4-dichlorophenoxy-propoxy-propylxanthate product as a crystalline solid melting at 140° to 143° C.

Example 5

1 mole quantities of 2-(2-(2,4-dichlorophenoxy)ethoxy)-ethanol and potassium hydroxide and 1.1 moles of carbon bisulfide were reacted together in diethyl ether in the previously described manner to obtain a potassium 2-(2-(2,4-dichlorophenoxy)ethoxy) - ethylxanthate product. The latter is a crystalline solid melting at 167° to 169° C.

Example 6

In an additional operation, 279 grams (1 mole) of 2,4-dichlorophenoxy-propoxy-propanol, 76.1 grams (1 mole) of carbon bisulfide and 2000 milliliters of anhydrous diethyl ether are placed in a reactor provided with a stirrer and Dry-Ice cooled condenser. 40 grams (1 mole) of sodium hydroxide is then added with stirring to the above mixture. Stirring is then continued for about 3 hours, and the reaction mixture thereafter filtered and dried to obtain a sodium 2,4-dichlorophenoxy-propoxy-propylxanthate product as a crystalline solid.

Example 7

1 mole quantities of 2-(2-(2,4-dichlorophenoxy)ethoxy) - ethanol, carbon bisulfide and sodium hydroxide are reacted together in the manner as described in Example 6 to obtain a sodium 2 - (2 - (2,4 - dichlorophenoxy)ethoxy) - ethylxanthate product as a crystalline solid.

In a similar manner, other metal xanthates of the haloaryl polyalkylene glycol monoethers may be prepared of which the following are representative.

Sodium 2-(2-(2,4,5-trichlorophenoxy)ethoxy) - ethylxanthate by reacting together 2-(2-(2,4,5-trichlorophenoxy)ethoxy)-ethanol, carbon bisulfide and sodium hydroxide.

Calcium 2 - chlorophenoxy - propoxy - propylxanthate by reacting together 2-chlorophenoxy-propoxy-propanol, carbon bisulfide and calcium hydroxide.

Sodium 2 - (2 - (4 - chloro - 2 - methylphenoxy)ethoxy) -ethylxanthate by reacting together 2 - (2 - (4 - chloro - 2 - methylphenoxy)ethoxy) - ethanol, carbon bisulfide and sodium hydroxide.

Sodium 4 - chloro - 2 - methylphenoxy - propoxy-propylxanthate by reacting together 4-chloro - 2 - methylphenoxy - propoxy - propanol, carbon bisulfide and sodium hydroxide.

Calcium 4 - chlorophenoxy - propoxy - propoxy-propylxanthate by reacting together 4-chlorophenoxy-propoxy-propoxy-propanol, carbon bisulfide and calcium hydroxide.

Other representative metal xanthates of the present invention are sodium 2,4-dibromophenoxy-ethoxy-ethylxanthate, potassium 4-bromo-2 - methylphenoxy - propoxy - propylxanthate, potassium 2,4,5-tribromophenoxy-ethoxy-ethylxanthate and sodium 2,4-dibromophenoxy-propoxy-propylxanthate.

A preferred embodiment of the present invention comprises the alkali metal xanthates of the chloroaryl-ethoxy-ethanols, chloroaryl-ethoxy-ethoxy-ethanols, chloroaryl-propoxy-propanols, and chloroaryl - propoxy - propoxy - propanols. The latter compounds may be characterized by the following formula

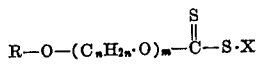

wherein $n$ and $m$ each represent one of the integers 2 and 3, X represents an alkali metal ion and R represents a chloroaryl radical such as monochlorophenyl, monochlorotolyl, dichlorophenyl and trichlorophenyl.

The haloaryl polyalkylene glycol monoethers employed as reactants in accordance with the present invention are conveniently prepared by reacting ethylene oxide or propylene oxide and a suitable substituted phenol in the presence of sodium hydroxide or sulphuric acid as catalyst. In carrying out the reaction, either 2 or 3 molecular proportions of the ethylene oxide or propylene oxide is employed with each molecular proportion of the phenol depending upon whether it is desired to introduce 2 or 3 alkylene oxide units into the molecule. In one method of making the compounds, the reactants are mixed and heated together in the presence of the catalyst for about an hour or longer at a temperature of 170° C. and under a pressure of 200 pounds per square inch. The desired ether alcohol is then obtained by subjecting the reaction product to fractional distillation under reduced pressure. Representative members of the haloaryl polyalkylene glycol monoethers are oily liquids characterized by the boiling points set forth in the following table:

| Compound | Boiling Point |
| --- | --- |
| 2-(2-(2,4-dichlorophenoxy) ethoxy)-ethanol. | 183° C. at 7 mm. pressure. |
| 2-(2-(2,4,5-trichlorophenoxy) ethoxy)-ethanol. | 160° C. at 0.3 mm. pressure. |
| 2-(2-(4-chloro-2-methyl-phenoxy) ethoxy)-ethanol. | 145°–147° C. at 0.8 mm. pressure. |
| 2-chlorophenoxy-propoxy-propanol. | 135° C. at 1 mm. pressure. |
| 4-chlorophenoxy-propoxy-propanol. | 165°–170° C. at 3 mm. pressure. |
| 2,4-dichlorophenoxy-propoxy-propanol. | 140°–145° C. at 0.5 mm. pressure. |
| 4-chloro-2-methylphenoxy-propoxy-propanol. | 165°–170° C. at 3 mm. pressure. |
| 4-chlorophenoxy-propoxy-propoxy-propanol. | 150°–154° C. at 2 mm. pressure. |

The preparation of compounds of the invention by an alternative procedure is illustrated as follows: An aqueous solution of zinc chloride is added portionwise to an aqueous solution of potassium 2,4-dichlorophenoxypropoxy-propylxanthate in the proportion of 1.25 mole of zinc chloride ($ZnCl_2$) for each 2 moles of the potassium xanthate compound. Following removal by evaporation of a portion of the water from the reaction mixture, zinc 2,4-dichlorophenoxy-propoxy-propylxanthate precipitates from the solution and is separated as a crystalline solid.

I claim:
1. A metal xanthate of a member of the group consisting of the haloaryloxy-ethoxy-ethanols, haloaryloxy-ethoxy-ethoxy-ethanols, haloaryloxy-propoxy-propanols and haloaryloxy-propoxy-propoxy-propanols wherein the aryloxy radical is of the benzene series.

2. A metal xanthate of a haloaryloxy-ethoxy-ethanol wherein the aryloxy radical is of the benzene series.

3. A metal xanthate of a haloaryloxy-ethoxy-ethoxy-ethanol wherein the aryloxy radical is of the benzene series.

4. A metal xanthate of a haloaryloxy-propoxy-propanol wherein the aryloxy radical is of the benzene series.

5. A metal xanthate of a haloaryloxy-propoxy-propoxy-propanol wherein the aryloxy radical is of the benzene series.

6. An alkali metal xanthate of a chloroaryloxy-ethoxy-ethanol wherein the aryloxy radical is of the benzene series.

7. An alkali metal xanthate of a chloroaryloxy-ethoxy-ethoxy-ethanol wherein the aryloxy radical is of the benzene series.

8. An alkali metal xanthate of a chloroaryloxy-propoxy-propanol wherein the aryloxy radical is of the benzene series.

9. An alkali metal xanthate of a chloroaryloxy-propoxy-propoxy-propanol wherein the aryloxy radical is of the benzene series.

10. Potassium 4-chloro-2-methylphenoxy-propoxy-propylxanthate.

11. Potassium 2-(2-(2,4-dichlorophenoxy)-ethoxy)ethylxanthate.

12. Potassium 2,4-dichlorophenoxy-propoxy-propyl-xanthate.

13. Potassium 4-chlorophenoxy-propoxy-propoxy-propylxanthate.

BRYANT CHARLES FISCHBACK.

References Cited in the file of this patent

UNITED STATES PATENTS

| Number | Name | Date |
|---|---|---|
| 2,024,925 | Hirschkind | Dec. 17, 1935 |
| 2,173,384 | Carter | Sept. 19, 1939 |